(12) United States Patent
Hillaert et al.

(10) Patent No.: US 11,944,175 B2
(45) Date of Patent: Apr. 2, 2024

(54) LUGGAGE ARTICLE WITH LOOP-SHAPED WHEEL BRACKET

(71) Applicant: Samsonite IP Holdings S.a r.l., Luxembourg (LU)

(72) Inventors: Rik Hillaert, Oudenaarde (BE); Vivien Cheng, De Pinte (BE); Wim De Vos, Zingem (BE); Michael Vandemergel, Oudenaarde (BE); Chui Wai Kin, Kowloon (HK); Peter Ten Haaf, Zonhoven (BE); Benjamin Vandeputte, Zottegem (BE); Bart Bauwens, Antwerp (BE)

(73) Assignee: Samsonite IP Holdings S.a r.l., Luxembourg (LU)

( * ) Notice: Subject to any disclaimer, the term of this patent is extended or adjusted under 35 U.S.C. 154(b) by 285 days.

(21) Appl. No.: 17/131,992

(22) Filed: Dec. 23, 2020

(65) Prior Publication Data
US 2021/0106105 A1 Apr. 15, 2021

Related U.S. Application Data

(63) Continuation of application No. 15/085,139, filed on Mar. 30, 2016, now Pat. No. 10,897,970.

(30) Foreign Application Priority Data

Mar. 31, 2015 (EP) .................................... 15161907

(51) Int. Cl.
 *A45C 5/14* (2006.01)
 *A45C 13/00* (2006.01)
(Continued)

(52) U.S. Cl.
 CPC ............... *A45C 5/14* (2013.01); *A45C 13/00* (2013.01); *B60B 33/0002* (2013.01); *B60B 33/045* (2013.01); *B60B 2200/45* (2013.01)

(58) Field of Classification Search
 CPC ......... A45C 5/14; A45C 13/00; B60B 33/002; B60B 33/045; B60B 2200/45
 See application file for complete search history.

(56) References Cited

U.S. PATENT DOCUMENTS

| 72,956 A | 12/1867 | Young et al. |
| 128,925 A | 7/1872 | Taylor |
| (Continued) | | |

FOREIGN PATENT DOCUMENTS

| CA | 2720562 A1 | 10/2009 |
| CN | 1315837 A | 10/2001 |
| (Continued) | | |

*Primary Examiner* — Tri M Mai
(74) *Attorney, Agent, or Firm* — Dorsey & Whitney LLP (57) ABSTRACT

A luggage article may include a plurality of walls together defining an outer structure of the luggage article, a wheel bracket attached to and extending from one of the walls, and one or more wheels attached to the wheel bracket. The wheel bracket may comprise a leaf spring having a loop-shaped profile and the one or more wheels may be rotationally attached to a lower end of the loop-shaped leaf spring. The configuration of the wheel bracket may result in higher shock absorption and reduced wheel noise comparative to conventional wheel brackets, and offer an improvement and alternative to conventional luggage wheel brackets.

16 Claims, 10 Drawing Sheets

(51) Int. Cl.
  *B60B 33/00* (2006.01)
  *B60B 33/04* (2006.01)

(56) References Cited

U.S. PATENT DOCUMENTS

| | | | |
|---|---|---|---|
| 326,540 | A * | 9/1885 | Baker .................... A63C 17/02 |
| | | | 280/11.19 |
| D47,390 | S | 5/1915 | Schwab |
| 1,936,701 | A | 11/1933 | Wilson |
| 1,940,823 | A | 12/1933 | Shinn |
| 2,033,191 | A | 3/1936 | Ridsdale |
| 2,086,557 | A | 7/1937 | Kaptuller |
| D114,527 | S | 5/1939 | Boden |
| 2,738,542 | A | 3/1956 | Clark, Jr. |
| 2,830,545 | A | 4/1958 | Robinson et al. |
| 2,914,340 | A | 11/1959 | Black |
| 2,923,961 | A | 2/1960 | Black |
| 2,942,290 | A | 6/1960 | Segal |
| 2,980,944 | A | 4/1961 | Bolinger |
| 2,987,752 | A | 6/1961 | Black |
| 3,102,744 | A | 9/1963 | Reuter et al. |
| 3,214,786 | A | 11/1965 | Butsch |
| 3,222,708 | A | 12/1965 | Butsch |
| 3,283,358 | A * | 11/1966 | Merriam ............. B60B 33/0002 |
| | | | 16/385 |
| 3,922,754 | A | 12/1975 | Andersen |
| 4,027,898 | A | 6/1977 | Steen |
| 4,084,288 | A | 4/1978 | Black |
| 4,152,001 | A * | 5/1979 | Christianson .......... A63C 17/01 |
| | | | 280/11.28 |
| 4,161,803 | A | 7/1979 | Propst |
| 4,336,629 | A | 1/1982 | Jarvis, Jr. et al. |
| 4,392,668 | A | 7/1983 | Mulholland |
| 4,402,521 | A | 9/1983 | Mongeon et al. |
| 4,403,784 | A | 9/1983 | Gray |
| 4,422,212 | A | 12/1983 | Sheiman et al. |
| 4,467,496 | A | 8/1984 | Gregg |
| 4,524,482 | A * | 6/1985 | Mueller .................... A45C 5/14 |
| | | | 267/157 |
| 4,649,595 | A | 3/1987 | Shane |
| 4,752,986 | A | 6/1988 | Rivkin et al. |
| 4,759,097 | A | 7/1988 | Black |
| 5,068,943 | A | 12/1991 | Estkowski |
| 5,075,924 | A | 12/1991 | Estkowski et al. |
| 5,102,107 | A | 4/1992 | Simon et al. |
| D359,676 | S | 6/1995 | Liang |
| 5,533,231 | A | 7/1996 | Bai |
| 5,615,450 | A | 4/1997 | Butler |
| 5,634,538 | A | 6/1997 | Tsai |
| D384,629 | S | 10/1997 | Nagashima |
| 5,785,154 | A | 7/1998 | Chen |
| 5,961,131 | A | 10/1999 | Hilgarth |
| 5,967,535 | A | 10/1999 | King |
| D421,338 | S | 3/2000 | Moon |
| D433,088 | S | 10/2000 | Galy |
| D434,904 | S | 12/2000 | Huang |
| 6,193,324 | B1 | 2/2001 | Chang |
| D438,382 | S | 3/2001 | Chang |
| D439,410 | S | 3/2001 | Chang |
| 6,256,835 | B1 | 7/2001 | Wang |
| D448,278 | S | 9/2001 | Chi |
| D448,826 | S | 10/2001 | Galy |
| 6,322,156 | B1 | 11/2001 | Kuo |
| 6,354,412 | B1 | 3/2002 | Kuo |
| 6,357,793 | B1 | 3/2002 | Dickie et al. |
| 6,409,196 | B1 | 6/2002 | McFarland |
| 6,478,315 | B1 * | 11/2002 | Manesis .................... A45C 5/14 |
| | | | 280/47.131 |
| D470,748 | S | 2/2003 | Tsai |
| 6,532,623 | B1 | 3/2003 | Watanabe |
| D473,379 | S | 4/2003 | Moon |
| 6,539,578 | B1 | 4/2003 | Guttmann et al. |
| D474,024 | S | 5/2003 | Santy |
| D476,484 | S | 7/2003 | Santy et al. |
| D481,931 | S | 11/2003 | Chi |
| D482,265 | S | 11/2003 | Wicha |
| D484,028 | S | 12/2003 | Moon |
| D487,348 | S | 3/2004 | Fenton et al. |
| D491,365 | S | 6/2004 | Proot |
| D492,894 | S | 7/2004 | Cheng |
| 6,776,428 | B2 | 8/2004 | Strong |
| D496,259 | S | 9/2004 | Cheng |
| 6,789,810 | B2 | 9/2004 | Strong |
| D505,316 | S | 5/2005 | Topel |
| 6,892,421 | B2 | 5/2005 | Cooper et al. |
| 6,908,087 | B2 | 6/2005 | Wintersgill et al. |
| 6,932,202 | B2 | 8/2005 | Houseberg |
| D513,560 | S | 1/2006 | Neumann |
| D525,033 | S | 7/2006 | Neumann |
| D539,543 | S | 4/2007 | Wu |
| D541,047 | S | 4/2007 | Moon |
| D541,048 | S | 4/2007 | Moon |
| 7,210,690 | B2 | 5/2007 | Tan |
| 7,213,818 | B2 | 5/2007 | Chang |
| D550,950 | S | 9/2007 | Vanderminden |
| D556,555 | S | 12/2007 | Tamara |
| D556,556 | S | 12/2007 | Tamara |
| D557,900 | S | 12/2007 | Sijmons |
| D575,512 | S | 8/2008 | Moon |
| D575,957 | S | 9/2008 | Scicluna et al. |
| D576,407 | S | 9/2008 | Moon |
| 7,437,801 | B2 | 10/2008 | Dahl |
| D581,161 | S | 11/2008 | Tong |
| D582,160 | S | 12/2008 | Sijmons |
| D582,678 | S | 12/2008 | Rekuc |
| 7,497,449 | B2 | 3/2009 | Logger |
| 7,506,404 | B2 | 3/2009 | Block et al. |
| D592,490 | S | 5/2009 | Frame |
| D603,163 | S | 11/2009 | Van Himbeeck |
| 7,657,969 | B2 | 2/2010 | Trivini |
| 7,744,102 | B2 | 6/2010 | Balley et al. |
| 7,832,533 | B2 | 11/2010 | Selvi |
| 7,891,051 | B2 | 2/2011 | Chou |
| D633,299 | S | 3/2011 | Moon |
| D634,124 | S | 3/2011 | Fair |
| D643,705 | S | 8/2011 | Maeda et al. |
| 8,020,679 | B2 | 9/2011 | Wu |
| D652,216 | S | 1/2012 | Fair |
| D659,395 | S | 5/2012 | Sijmons |
| 8,452,508 | B2 | 5/2013 | Frolik et al. |
| 8,490,243 | B2 | 7/2013 | Guo et al. |
| 8,533,908 | B2 | 9/2013 | Scicluna |
| D697,717 | S | 1/2014 | Santy |
| D698,153 | S | 1/2014 | Santy |
| 8,662,516 | B1 | 3/2014 | Slagerman |
| D703,442 | S | 4/2014 | Parker |
| 8,752,243 | B2 | 7/2014 | Guo et al. |
| 8,783,700 | B2 | 7/2014 | Li |
| 8,806,714 | B2 | 8/2014 | Eguchi |
| 8,807,584 | B2 | 8/2014 | Lasher |
| D718,938 | S | 12/2014 | Parker |
| D721,497 | S | 1/2015 | Parker |
| D721,501 | S | 1/2015 | Parker |
| D728,354 | S | 5/2015 | Fan |
| D729,051 | S | 5/2015 | Fan |
| D732,293 | S | 6/2015 | Parker et al. |
| 9,044,656 | B2 | 6/2015 | Zhang |
| D735,022 | S | 7/2015 | Fan |
| D741,599 | S | 10/2015 | Parker |
| 9,216,754 | B2 | 12/2015 | Chen |
| D753,920 | S | 4/2016 | Parker |
| D755,524 | S | 5/2016 | Parker |
| D767,280 | S | 9/2016 | Parker |
| 9,636,948 | B2 | 5/2017 | Hillaert et al. |
| 9,788,623 | B1 | 10/2017 | Chen |
| D811,090 | S | 2/2018 | Karl |
| D841,330 | S | 2/2019 | Karl |
| D841,331 | S | 2/2019 | Karl |
| D841,332 | S | 2/2019 | Karl |
| D848,740 | S | 5/2019 | Karl |
| 10,897,970 | B2 | 1/2021 | Hillaert et al. |
| 2002/0069479 | A1 | 6/2002 | Kuo |
| 2002/0144375 | A1 | 10/2002 | Drucker et al. |
| 2004/0111830 | A1 | 6/2004 | Cooper et al. |

(56) References Cited

U.S. PATENT DOCUMENTS

| | | | |
|---|---|---|---|
| 2005/0218171 A1* | 10/2005 | Bellerive | A45F 3/042 224/576 |
| 2006/0043688 A1 | 3/2006 | Chang | |
| 2007/0056141 A1 | 3/2007 | Armano et al. | |
| 2007/0119661 A1 | 5/2007 | Chang | |
| 2008/0007022 A1 | 1/2008 | Jones | |
| 2008/0116660 A1 | 5/2008 | Nicholls | |
| 2008/0120803 A1 | 5/2008 | Bryant | |
| 2009/0031533 A1 | 2/2009 | Yan | |
| 2010/0230223 A1 | 9/2010 | Wu | |
| 2011/0168508 A1 | 7/2011 | Jiang | |
| 2012/0005858 A1 | 1/2012 | Lai | |
| 2012/0086193 A1 | 4/2012 | Guo | |
| 2012/0255141 A1 | 10/2012 | Lin et al. | |
| 2012/0311821 A1 | 12/2012 | Eguchi | |
| 2013/0093155 A1 | 4/2013 | Gong | |
| 2013/0175129 A1 | 7/2013 | Rankin et al. | |
| 2013/0205544 A1 | 8/2013 | Dayt et al. | |
| 2014/0041978 A1 | 2/2014 | Chang | |
| 2014/0110204 A1 | 4/2014 | Wu | |
| 2014/0232077 A1 | 8/2014 | Zhang | |
| 2014/0262661 A1 | 9/2014 | Mathieu et al. | |
| 2015/0102573 A1 | 4/2015 | Hillaert et al. | |
| 2015/0150347 A1 | 6/2015 | Scicluna | |
| 2017/0087441 A1* | 3/2017 | Ivazes | A63C 17/0046 |
| 2017/0367450 A1 | 12/2017 | Karl | |

FOREIGN PATENT DOCUMENTS

| | | | |
|---|---|---|---|
| CN | 1852811 A | 10/2006 | |
| CN | 201194600 Y | 2/2009 | |
| CN | 101443201 B | 12/2010 | |
| CN | 201675239 U | 12/2010 | |
| CN | 201768099 U | * 3/2011 | A61G 5/10 |
| CN | 202278929 U | 6/2012 | |
| CN | 102578778 A | 7/2012 | |
| CN | 202407510 | 9/2012 | |
| CN | 202528768 | 11/2012 | |
| CN | 102991559 A | 3/2013 | |
| CN | 202782503 U | 3/2013 | |
| DE | 29710837 U1 | 8/1997 | |
| DE | 20309968 U1 | 8/2003 | |
| EM | 001175822-0002 | 4/2009 | |
| EM | 0025143640002 | 8/2014 | |
| EM | 0025637830003 | 10/2014 | |
| EM | 002872192-0011 | 11/2015 | |
| EM | 002872192-0015 | 11/2015 | |
| EM | 0028721920001 | 11/2015 | |
| EM | 0028721920002 | 11/2015 | |
| EM | 0028721920012 | 11/2015 | |
| EP | 0075456 A1 | 3/1983 | |
| EP | 0051995 A1 | 11/1986 | |
| EP | 1117311 A1 | 7/2001 | |
| EP | 2862473 A1 | 4/2015 | |
| FR | 2007012 A1 | 1/1970 | |
| FR | 2763285 A1 | 11/1998 | |
| FR | 2799179 B3 | 4/2001 | |
| GB | 239701 A | 9/1925 | |
| GB | 450893 A | 7/1936 | |
| GB | 928709 A | 6/1963 | |
| JP | 2009050375 A | 3/2009 | |
| JP | 2009050375 A | * 3/2009 | |
| JP | 2013237446 A | 11/2013 | |
| WO | 2007118102 A1 | 10/2007 | |

* cited by examiner

LUGGAGE ARTICLE WITH LOOP-SHAPED WHEEL BRACKET

CROSS-REFERENCE TO RELATED APPLICATIONS

This application is a continuation of U.S. patent application Ser. No. 15/085,139, filed on Mar. 30, 2016 and entitled "Luggage Article With Loop-Shaped Wheel Bracket" which claims priority to European patent application No. 15161907.9 filed on Mar. 31, 2015 and entitled "Luggage Article With Loop-Shaped Wheel Bracket", which are hereby incorporated by reference herein in their entireties for all purposes.

TECHNICAL FIELD

The present disclosure relates generally to a wheeled luggage article and particularly to a luggage article with a loop-shaped wheel bracket.

BACKGROUND

Luggage items and in particular luggage cases (i.e., suitcases) conventionally include wheels attached to the case to allow the case to be pulled along. Brackets attach the wheels to the cases. Each bracket supports one or more wheels and generally permits the one or more wheels to rotate about a horizontal axis. Each bracket may be fixed about a vertical axis to prevent the one or more wheels from swivelling about the vertical axis (generally referred to as fixed wheels) or may be rotational about the vertical axis to permit swivelling of the one or more wheels about the vertical axis (generally referred to as spinner wheels).

The design of such wheels and wheel assemblies for luggage articles presents a particular unique challenge. Specifically the wheels have to be robust enough to withstand use under heavy loading of the case and transport over rough surface as well as when the case is dropped on its wheels. On the other hand the wheels must also be light and compact so as to maximize the weight and volume that the luggage article can carry for a given overall size and weight. The wheels must also be simple and relatively cheap to produce and assemble to minimize cost.

A further problem that has been identified with conventional cases is that the wheel brackets generally transfer shock loads from the wheels to the cases and may be noisy as well. As such, the shock loads commonly are transferred through the case, disturb the arrangement of one's belongings, and/or cause damage to the belongings. The noise may be an annoyance and may make the use of the luggage case unpleasant.

It is therefore desirable to provide an improved luggage article, and more specifically an improved wheel bracket that addresses the above described problems and/or which more generally offers improvements or an alternative to existing arrangements.

Documents that may be related to the present disclosure in that they include various wheel brackets are: CN102578778, CN201194600, CN201675239, CN202278929, CN202407510, CN20528768, EP001175822-0002, EP0051995, US20110168508, U.S. Pat. Nos. 2,738,542, 2,914,340, 2,923,961, 2,942,290, 2,987,752, 4,392,668, 4,422,212, and 6,478,315.

SUMMARY

According to the present disclosure there is therefore provided a luggage article as described in the accompanying claims.

The present disclosure advantageously provides a luggage article with a shock absorbing wheel bracket having a loop-shaped profile. The wheel bracket may have an open-loop or closed-loop shape, and in some examples may have a generally C-shape profile. The wheel bracket may include an upper end portion that is attached to the luggage article and a lower end portion that is attached to the one or more wheels. The wheel bracket may include a spring member, such as a leaf spring, which may be overmoulded with a plastic material. The wheel bracket advantageously may provide improved shock absorption and/or rolling noise reduction compared to conventional luggage articles.

In one example, a luggage article having a loop-shaped wheel bracket is provided. The luggage article includes a luggage wheel assembly having a wheel bracket attached to and extending from the luggage article. The luggage article may also include one or more wheels attached to the wheel bracket. The wheel bracket includes a spring member having a loop-shaped profile and the one or more wheels are rotationally attached to a lower end of the loop-shaped spring member.

In some examples, the wheel bracket is rotationally attached to the luggage article. In some examples, the wheel bracket is attached to the luggage article at a location on an upper arm of the spring member. In some examples, the wheel bracket is attached to the luggage article at an intermediate position or proximate an end portion of the upper arm.

In some examples, the luggage wheel assembly has a loop-shaped spring member which includes a lower arm that is integrally formed with the upper arm and defines a transition. The lower arm may extend radially inwardly from the transition toward a rotational axis of the one or more wheels. In some examples, the transition defines an apex. In another example, the upper and lower arms extend from the transition or apex at an angle of between 0 and 90 degrees, and preferably between 30 and 60 degrees.

The luggage wheel assembly includes a loop-shaped spring member. In some examples, the loop shaped spring member is selected from a metal leaf spring, a steel leaf spring, a titanium leaf spring, a polymeric leaf spring, a carbon-fiber-reinforced composite leaf spring, or a combination thereof.

In some aspects, the wheel bracket further includes a coating that surrounds the loop-shaped spring member. In some examples, the coating forms a hub at a lower end of the loop-shaped spring member for attaching the one or more wheels to the wheel bracket. In some examples, the coating forms a spinner wheel axle housing at an intermediate portion of an upper arm of the loop-shaped spring member. In some aspects, the spinner axle housing defines a swivel axis about which the wheel bracket spins relative to the luggage article.

In some examples, the luggage wheel assembly includes a spring member defining one or more engagement features that receives a portion of the coating to form a mechanical attachment between the spring member and the coating.

In some aspects, at least one portion of the upper arm of the spring member extends substantially horizontally or extends substantially uniformly about a portion of the outer circumference of the one or more wheels. The wheel bracket may be attached to the luggage article at the at least one portion, where the at least one portion is a substantial portion of the upper arm.

In another example, the wheel bracket of the luggage wheel assembly is attached to the luggage article adjacent the transition of the spring member or distal to the transition at a distance that is substantially the length of the upper arm. In some examples, an effective arm length defined by the upper arm may be substantially greater than, or greater than, or less than, or substantially less than an effective arm length defined by the lower arm. In some examples, at least one portion of the lower arm of the spring member extends to form a curve, a substantially straight length, or a twisted shape. In some examples, the rotational axis of the one or more wheels is substantially parallel to or substantially at a right angle to a surface of the upper arm and/or the lower arm of the spring member.

In some examples, the luggage wheel assembly may have at least one portion of the lower arm of the spring member oriented substantially parallel to the one or more wheels or oriented substantially perpendicular to the rotational axis of the one or more wheels. In some examples, at least a portion of the lower arm is twisted such that at least one end portion of the lower arm distal to the transition of the spring member is oriented substantially parallel to the one or more wheels or is oriented substantially perpendicular to the rotational axis of the one or more wheels.

In some aspects, at least one end portion of the lower arm defines a hub for attaching the one or more wheels.

In other examples, the luggage wheel assembly includes a wheel bracket that forms one or more wheel abutments adapted to contact an outer circumferential surface of the one or more wheels to limit the deformation of the loop-shaped spring member. In some examples, the one or more wheels comprise one wheel or two wheels. In some examples, the wheel bracket is located between a pair of wheels or the wheel bracket includes laterally-spaced apart tines that extend along opposite sides of a single wheel.

In some aspects, the luggage wheel assembly includes a wheel bracket and the one or more wheels of the wheel bracket form part of a spinner wheel assembly.

In some examples, the loop-shaped profile of the spring member is an open loop profile or a closed loop profile. In some examples, the spring member having the open loop profile is a C-shaped spring member. In some examples, the spring member having the closed loop profile is an O-shaped or oval-shaped or D-shaped spring member.

In one aspect, a luggage article includes one or more luggage wheel assemblies as described herein. The luggage article includes a plurality of walls together defining an outer structure of the luggage article, and the one or more luggage wheel assemblies are attached to and extend from one of the walls.

This summary of the disclosure is given to aid understanding, and one of skill in the art will understand that each of the various aspects and features of the disclosure may advantageously be used separately in some instances, or in combination with other aspects and features of the disclosure in other instances.

BRIEF DESCRIPTION OF THE DRAWINGS

The present disclosure will now be described by way of example only with reference to the following figures in which.

DETAILED DESCRIPTION

Figures 1, 2:
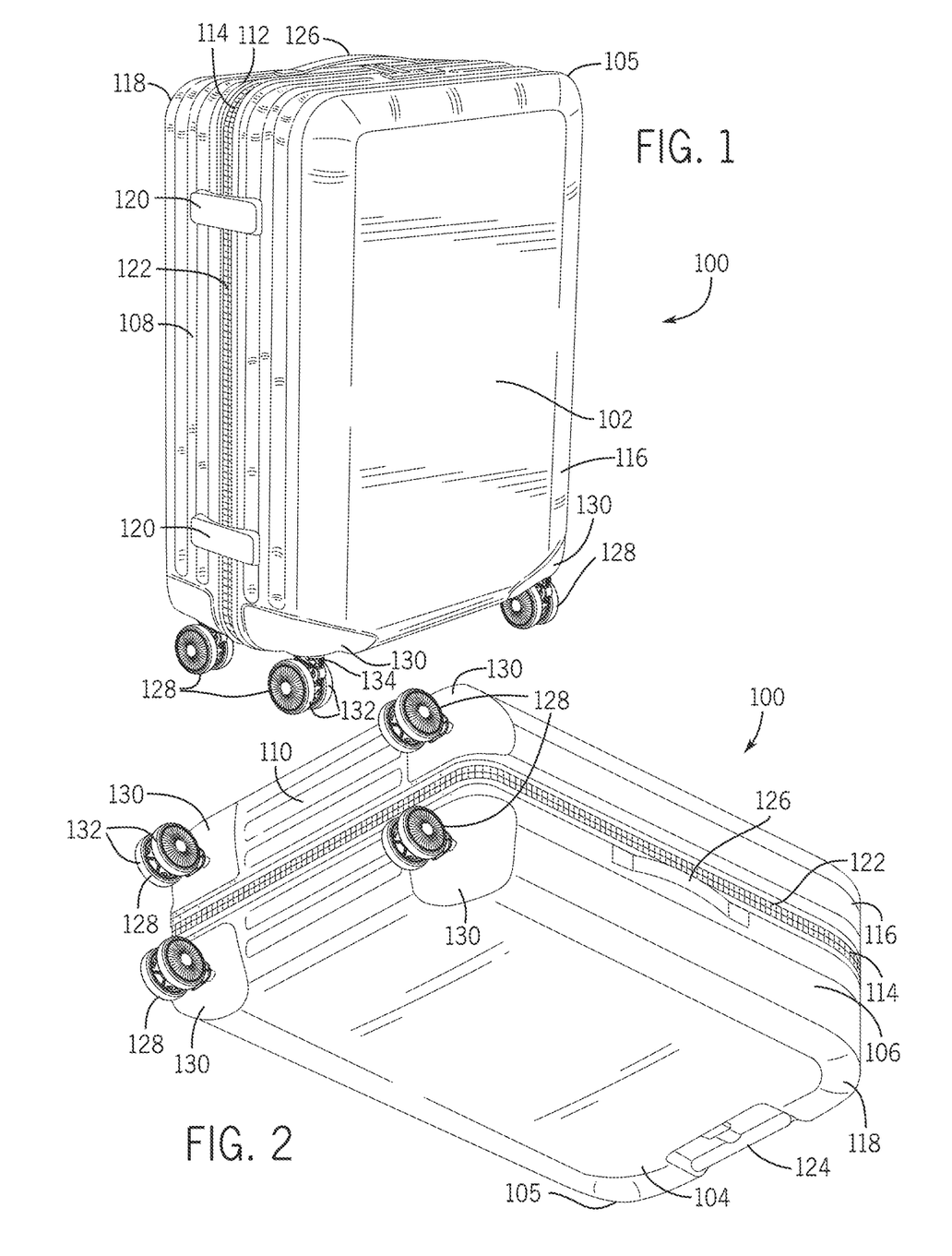
FIG. 1 is a schematic front perspective view of a luggage article according to a first example.
FIG. 2 is a schematic rear view of a luggage article shown in FIG. 1.

Referring to FIGS. 1 and 2, a wheeled luggage article 100 according to an embodiment includes a generally cuboid structure 105 formed from a plurality of walls 102,104,106, 108,110,112 defining an enclosed internal volume of the luggage article 100 in which to carry a user's belongings. The luggage article 100 includes opposing front and rear walls 102,104, opposing side walls 106,108, and opposing top and bottom end walls 110,112 that collectively define a housing or outer structure 105 of the article 100. The luggage article 100 may be a bag, a case, or other luggage articles. The luggage article 100 may be hard and/or soft sided.

The luggage article 100 may be split along an opening line 114 into a lid section 116, which includes the front wall 102, and a base section 118, which includes the rear wall 104. The lid section 116 may be connected to the base section 118 along a portion of a side of the article 100 via a hinge 120 in a conventional manner, and the luggage article 100 may be opened at the opening line 114 to access the internal volume. The hinge 120 may be formed of a zipper 122 and a fabric strip, a piano hinge, discrete hinges spaced apart, or an articulating joint. The piano hinge, the discrete hinges, or the articulating joint may be made from metal, plastic, any other suitable material, or any combination thereof. The hinge 120 may be stitched to the lid 116 and also to the base 118, or may be coupled in another suitable manner. A zipper 122 along a periphery of the opening line 114 or other conventional closure arrangement, for example clamp locks, may secure the lid section 116 to the base section 118 to close the luggage article 100.

The luggage article 100 may include at least one handle. The depicted luggage article 100 includes a telescoping tow handle 124 associated with the top wall 112. The depicted case also includes fixed carry handles 126 attached to the top wall 112 and the side wall 106. The telescoping handle 124 and the fixed carry handles 126 may be associated with any wall of the luggage article 100.

The luggage article 100 may include at least one wheel assembly 128. The depicted luggage article 100 includes four wheel assemblies 128 mounted from the bottom end wall 110 of the case 110. Each spinner wheel assembly 128 is located proximate a bottom end corner of the luggage article 100. In other words, each spinner wheel assembly 128 is located on the bottom end wall 110 of the case near an intersection of one of the front and rear walls 102,104 and one of the side walls 106,108 of the luggage article 100. The spinner wheel assemblies 128 may be spaced apart from one another by substantially the width and/or depth of the luggage article 100.

Figures 3, 4:
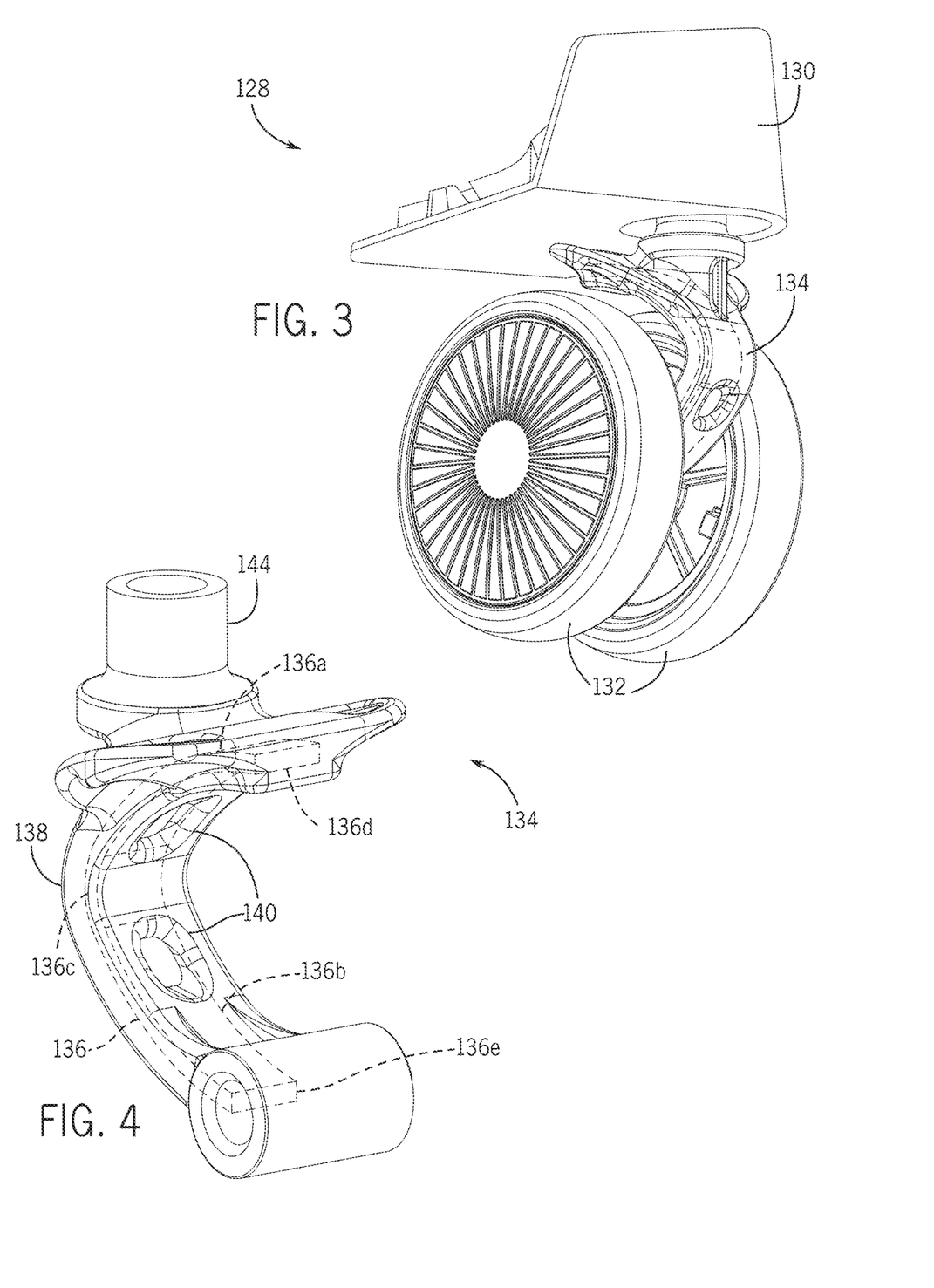
FIG. 3 is a schematic front perspective view of a wheel assembly of a luggage article shown in FIG. 1.
FIG. 4 is a schematic rear perspective view of a bracket of a wheel assembly shown in FIG. 3 of a luggage article shown in FIG. 1.

Referring to FIGS. 1 to 3, each spinner wheel assembly 128 may include a wheel mount 130, one or more wheels 132, and a wheel bracket 134. The wheel mount 130 generally attaches the wheel bracket 134 to the luggage article 100. The wheel mount 130 may be attached to the corners of the luggage article 100 formed by the intersection of any three adjacent walls. In other embodiments the wheel mount 130 may be attached to the article 100 at other locations. The bracket 134 may be rotationally mounted to the bottom end wall 110 of the article 100 via the wheel mount 130 to rotate about a generally vertical spinner axis 148 (see FIG. 7) oriented perpendicular to the bottom end wall 110 of the luggage article 100. A pair of wheels 132 (although only one wheel may be provided in other embodiments) may be rotationally mounted to the wheel bracket 134 to rotate about a wheel axis 158 (see FIGS. 5-6). As shown in FIG. 3, the pair of wheels 132 may be spaced apart from one another along the wheel axis 158 (such that the wheels 132 are co-axial), and the wheel bracket 134 may be located between the wheels 132. The wheel axis 158 may be generally horizontal and parallel to the bottom wall 110 of the luggage article 100. Such an arrangement allows the spinner wheels 132 to rotate about two orthogonal axes: the horizontal wheel axis 158 and the vertical spinner axis 148. The spinner wheel assemblies 128 support the article 100 in a vertical upright orientation relative to a support surface and generally allows the luggage article 100 to be wheeled along the support surface in a stable upright orientation as shown in FIG. 1. In other embodiments, the luggage article 100 may include at least one wheel having a fixed vertical axis and configured to allow rolling movement of the luggage case.

Referring to FIGS. 4-8, the wheel bracket 134 may include a spring member 136, such as a leaf spring 136. The spring member may have a variety of shapes, but generally has the shape of an open loop or closed loop, referred to herein with respect to the various examples as a "loop-shaped profile." The spring member may be formed as either an open loop, having a generally C-shaped profile as depicted, for example, in FIGS. 4-8, or alternatively, the spring member may be closed loop having a generally O-shaped or oval shaped profile, as depicted, for example, in FIGS. 18 and 20. The leaf spring 136 may flex upon impact to absorb or attenuate impact loads imparted on the wheels 130, thereby reducing the forces transferred to the outer structure 105. The leaf spring 136 may have a rectangular or substantially rectangular cross-section and be generally elongate or slender. The width of the leaf spring 136 may be larger than the height of the spring 136 such that the aspect ratio of the leaf spring 136 is greater than one. The leaf spring 136 may be metallic, non-metallic, polymeric, composite, or a combination thereof. For example, the leaf spring 136 may be formed from spring steel, reinforced plastic, or other suitable materials. In some implementations, the leaf spring 136 is metal and formed from spring steel or titanium. In some implementations, the leaf spring 136 is formed from composite materials, such as carbon-fiber-reinforced composite.

The leaf spring 136 may include integrally-formed upper and lower arms 136*a*, 136*b* that converge together to form a transition 136*c*. The transition 136*c* may define an apex between lower arms 136*a* and 136*b*. The upper arm 136*a* may be formed as a substantially mirror image of the lower arm 136*b* about the transition 136*c* of the leaf spring 136 so that the upper and lower arms are symmetrical about the transition. The transition 136*c* may be positioned substantially equidistant between the upper and lower ends 136*d*, 136*e* of the leaf spring 136. When the leaf spring 136 is operatively attached to a wheel 132, the upper arm 136*a* may be referred to as an outer arm 136*a*, the lower arm 136*b* may be referred to as an inner arm 136*b*, the upper end 136*d* may be referred to as an outer end 136*d*, and the lower end 136*e* may be referred to as an inner end 136*e* based on the location of these features relative to a rotation axis of the wheel.

The leaf spring 136 may be over injected or overmoulded with a material to form a coating or outer layer 138. The coating 138 may entirely encapsulate or surround the leaf spring 136, except for one or more optional injection holes formed in the coating 138 during the moulding process and through which the leaf spring 136 may be exposed. Alternatively, the coating 138 may only partially encapsulate or surround the leaf spring 136. The coating 138 may be formed from plastic or other suitable materials. The coating 138 may be transparent, translucent, opaque, or a combination thereof, thereby providing the wheel bracket 134 with a distinct visual appearance. In implementations where the coating 138 is transparent or translucent, the leaf spring 136 may be visible through the coating 138. The coating 138 may resist creep in the leaf spring 136, especially around the transition 136*c* of the leaf spring 136. For example, the coating 138 may provide additional stiffness to the leaf spring 136 to resist the tendency of the leaf spring 136 to permanently deform as a result of long-term exposure to high levels of stress that are below the yield strength of the leaf spring. The coating may be selectively applied to the areas most benefitting from the coating, such as but not limited to adjacent the transition 136*c*.

Figure 7:
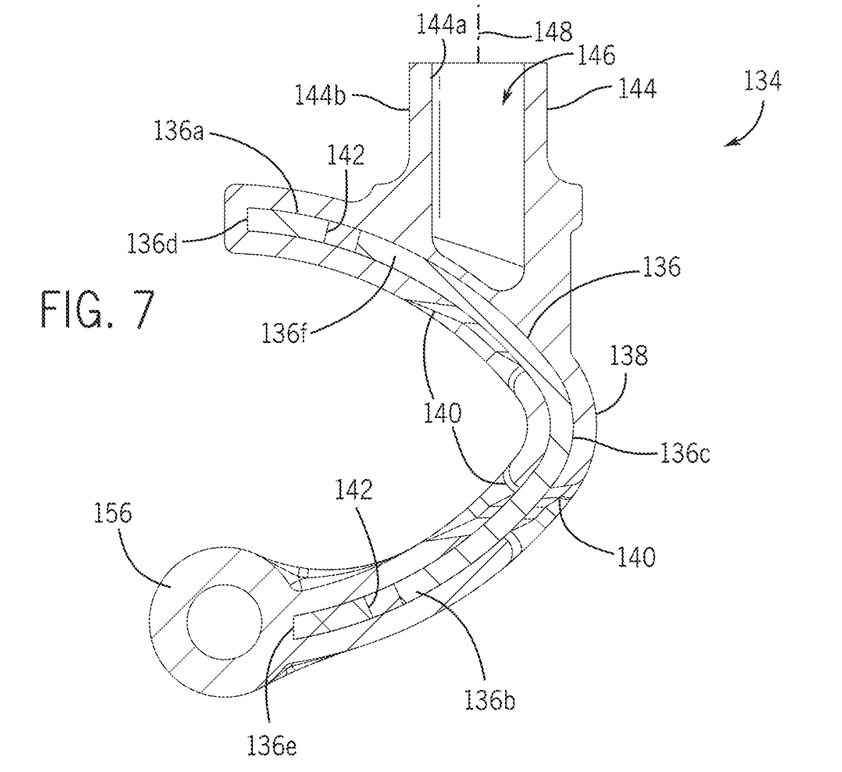
FIG. 7 is a schematic cross-sectional view of a bracket of a wheel assembly shown in FIG. 3 of a luggage article shown in FIG. 1 that is taken along the line 7-7 shown in FIG. 5.
Figure 8:
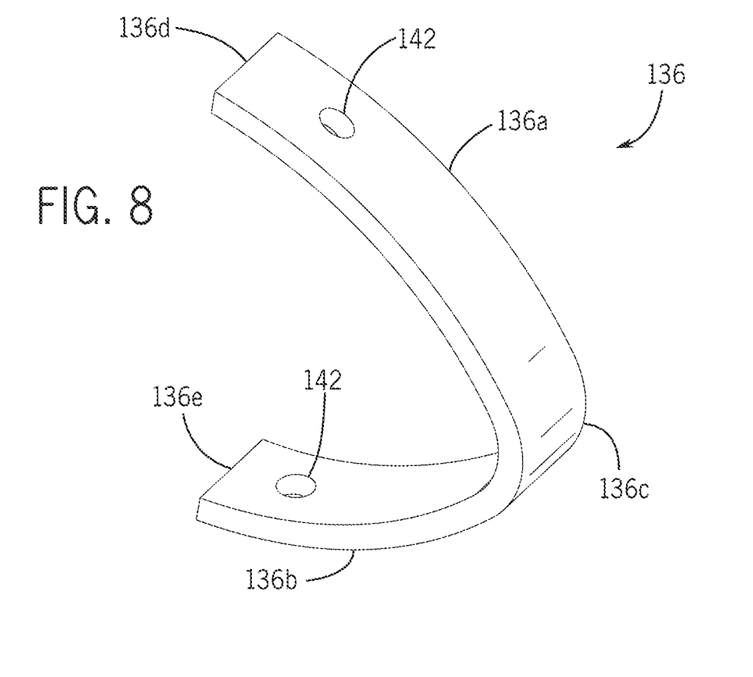
FIG. 8 is a schematic front perspective view of a spring member of a bracket shown in FIG. 4 of a wheel assembly shown in FIG. 3 of a luggage article shown in FIG. 1.

With specific reference to FIGS. 7 and 8, the leaf spring 136 may define one or more engagement features 142, such as protrusions that project outwardly from the leaf spring or the depicted apertures, holes, or recessed areas 142 that receive the coating material to form a mechanical attachment or bonding between the leaf spring 136 and the coating 138. During the moulding process, the plastic material may flow into and/or through the recessed areas 142 to create a mechanical connection between the coating 138 and the leaf spring 136. The mechanical attachment enhances force transfer between the leaf spring 136 and the coating 138. The coating 138 also may be bonded onto the surface of the leaf spring 136, or only through the engagement features 142. The mechanical attachment or bonding between the leaf spring 136 and the coating 138 may enhance the creep resistance of the wheel bracket 134.

Figure 5:
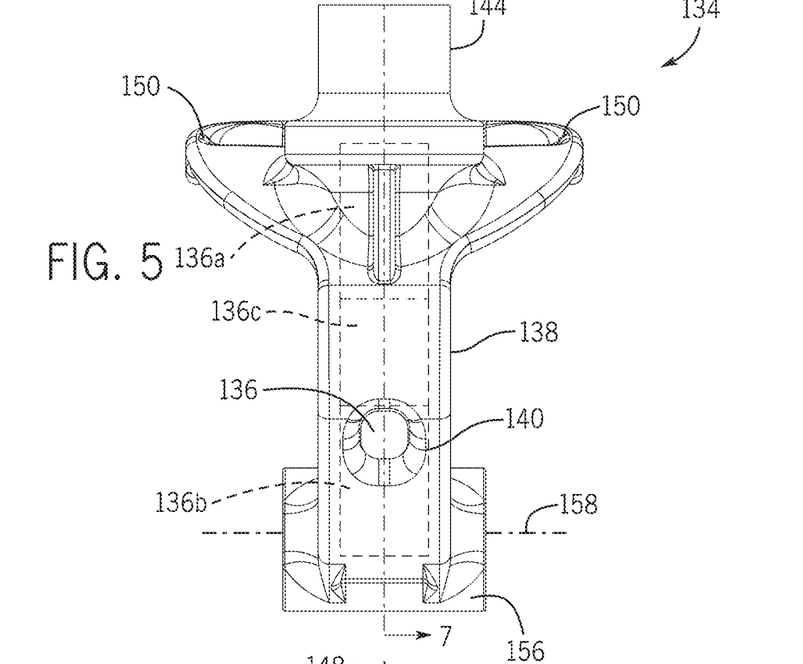
FIG. 5 is a schematic front elevation view of a bracket of a wheel assembly shown in FIG. 3 of a luggage article shown in FIG. 1.
Figure 6:
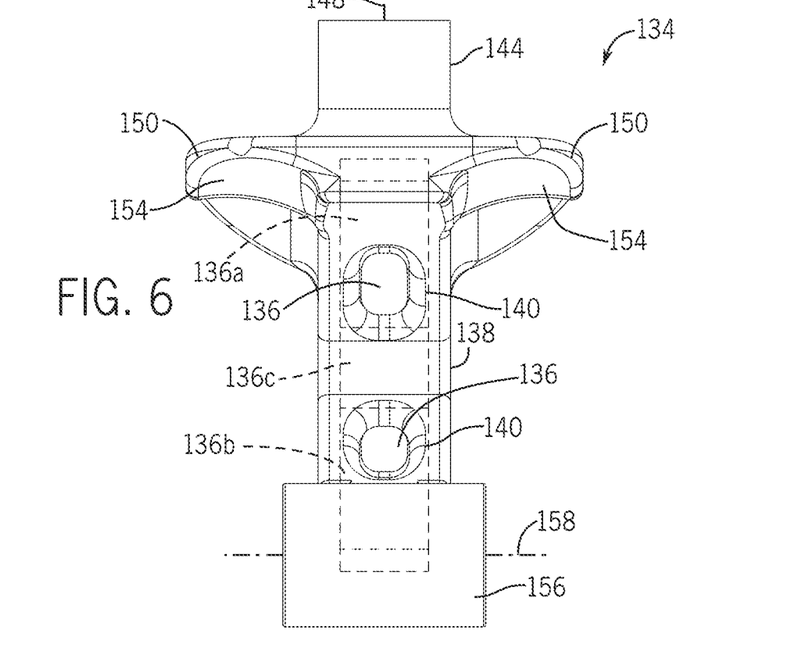
FIG. 6 is a schematic rear elevation view of a bracket of a wheel assembly shown in FIG. 3 of a luggage article shown in FIG. 1.

Referring to FIGS. 5-6, the wheel bracket 134 may include one or more wings or wheel abutments 150 adapted to contact a circumferential surface 152 of a wheel 132 (see FIG. 9) to limit deformation of the leaf spring 136 and/or wheel travel of the one or more wheels 132. The wheel abutments 150 may form an enlarged projecting portion or cowl of the upper arm 136a of the leaf spring 136. The coating 138 may form a pair of wheel abutments 150 that extend laterally from opposing sides of the upper arm 136a of the leaf spring 136. The wheel abutments 150 may include a curved inner surface 154 having a curvature that substantially corresponds to the circumferential surface 152 of the one or more wheels 132 (see FIGS. 6 and 9).

Referring to FIGS. 3-7, the wheel bracket 134 may be rotationally attached to one of the walls (102,104,106,108, 110,112) by a spinner axle housing 144. The spinner axle housing 144 may be positioned along a length of the upper arm 136a between the transition 136c and the upper end 136d of the leaf spring 136. That is, the spinner axle housing 144 may be located at an intermediate portion 136f of the upper arm 136a of the loop-shaped leaf spring 136 (see FIG. 7). The spinner axle housing 144 may be formed by the coating 138 as an upwardly-extending cylindrical sleeve having an open upper end. An internal cylindrical surface 144a of the spinner axle housing 144 may rotationally bear against a spinner axle received within an inner space 146 of the spinner axle housing 144 during swivelling of the wheel bracket 134 relative to the wheel mount 130 (see FIG. 3). Additionally or alternatively, an outer cylindrical surface 144b of the spinner axle housing 144 may rotationally bear against a bearing surface of the wheel mount 130 during swivelling of the wheel bracket 134 relative to the wheel mount 130. The spinner axle housing 144 may define a swivel axis 148 about which the wheel bracket 134 spins relative to the wheel mount 130.

Referring to FIGS. 4-7, the one or more wheels 132 may be rotationally attached to the lower arm 136b of the leaf spring 136. The coating 138 may form a hub 156 at the lower end 136e of the leaf spring 136 for attaching the one or more wheels 132 to the wheel bracket 134. The hub 156 may receive an axle and/or axle bearing associated with the one or more wheels 132. The hub 156 may be formed as a cylindrical sleeve. The hub 156 may define a rotational axis 158 of the one or more wheels 132 (see FIGS. 5-6). The rotational axis 158 may be oriented horizontally. As noted above, the rotational axis 158 may be oriented perpendicular to the swivel axis 148.

As shown in FIG. 7, the swivel axis 148 may be horizontally offset from the rotational axis 158. The spinner axle housing 144 may be located closer to the transition 136c of the leaf spring 136 than the hub 156 is located to the transition 136c. In these implementations, the effective lever arm between the hub 156 and the transition 136c (which may be the full length of the lower arm 136b of the leaf spring 136) is longer than the effective lever arm between the spinner axle housing 144 and the transition 136c (which may be a portion of the entire length of the upper arm 136a of the leaf spring 136). As such, for a given impact load, the leaf spring 136 may resiliently deform and the hub 156 may move upwardly toward the upper arm 136a of the leaf spring 136.

Alternatively, the spinner axle housing 144 may be located farther away from the transition 136c of the leaf spring 136 than the hub 156 is located to the transition 136c. In these alternative implementations, the effective lever arm between the hub 156 and the transition 136c (which may be a portion of the full length of the lower arm 136b of the leaf spring 136) is shorter than the effective lever arm between the spinner axle housing 144 and the transition 136c (which may be the entire length of the upper arm 136a of the leaf spring 136). As such, for a given impact load in these alternative implementations, the leaf spring 136 may resiliently deform and the spinner axle housing 144 may move downwardly toward the lower arm 136b of the leaf spring 136.

Figure 9:
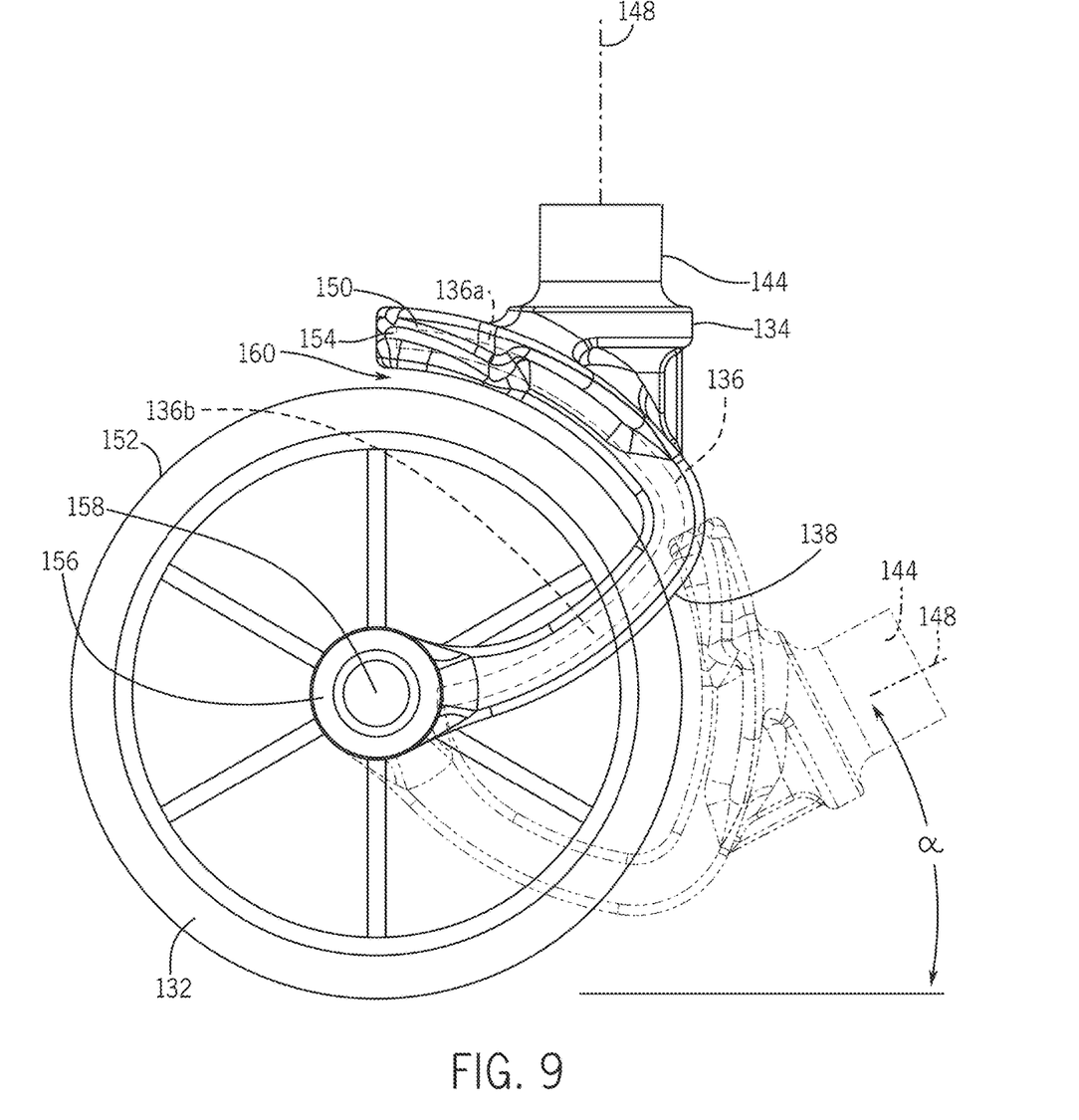
FIG. 9 is a schematic side elevation view of a bracket of a wheel assembly shown in FIG. 3 of a luggage article shown in FIG. 1 with a wheel attached to the bracket.

Referring to FIG. 9, a wheel 132 is rotationally attached to the hub 156 of the wheel bracket 134. The lower arm 136b extends outwardly from the rotational axis 158 of the wheel 132 (which may be defined by the hub 156) in a generally radial orientation toward the transition 136c of the leaf spring 136. The transition 136c may be positioned outwardly of the outer circumference 152 of the wheel 132. The transition 136c may extend outwardly from the outer circumference 152 by a distance that permits the luggage article 100 to be tilted to about 30 degrees relative to a support surface (see angle α in FIG. 9) so that a user may wheel the luggage article 100 on two wheels in a tilted orientation without the transition 136c of the leaf spring 136 contacting or interfering with the support surface (see the dashed illustration of the tilted wheel bracket 134 in FIG. 9). Alternatively, the transition 136c may be positioned at or inwardly from the outer circumference 152 of the wheel 132.

Still referring to FIG. 9, the upper arm 136a of the loop-shaped leaf spring 136 may be spaced outwardly of the outer circumference 152 of the one or more wheels 132. As such, the distance between the upper and lower ends 136d, 136e of the leaf spring 136 may be larger than the radius of the wheel 132. As shown in FIG. 9, the upper arm 136a may extend substantially uniformly about a portion of the outer circumference 152 of the wheel 132 (such as approximately one-sixth of the wheel circumference) such that an annular gap 160 is formed radially between the upper arm 136 (including the coating 138) and the wheel 132. During resilient deflection of the leaf spring 136, the gap 160 between the upper arm 136 and the wheel 132 may decrease until the abutment surface 154 of the wheel abutment 150 contacts the outer circumference 152 of the wheel 132. In some implementations, the upper arm 136a of the leaf spring 136 may be positioned laterally adjacent the wheel 132 at or radially inwardly from the outer circumference 152 of the wheel 132. In these implementations, the wheel abutment 150 may extend outwardly from the upper arm 136a in a radial direction and extend over the outer circumference 152 of the wheel 132 in a spaced relationship.

During operation, the lower arm 136b of the leaf spring 136 may resiliently pivot about the transition 136c of the leaf spring 136 and/or bend or flex along its length in a relatively upwardly direction towards the upper arm 136a to absorb, attenuate, or dampen impact loads imparted on the one or more wheels 132. Similarly, the upper arm 136a of the leaf spring 136 may resiliently pivot about the transition 136c of the leaf spring 136 and/or bend or flex along its length in a relatively downwardly direction towards the lower arm 136b to absorb, attenuate, or dampen loads generated by the weight of the user's belongings. Thus, during operation, the arms 136a, 136b of the leaf spring 136 may elastically deform toward one another to absorb, attenuate, or dampen impact loads.

To limit the compressive deformation of the leaf spring 136, the one or more wheels 132 may abut directly against the wheel bracket 134. The curved inner surface 154 of the wheel abutment 150 may be adapted to contact the outer circumferential surface 152 of the wheel 132, thereby providing a positive stop to the travel of the one or more wheels 132 and preventing plastic deformation of the leaf spring 136. The leaf spring 136 may be designed such that the inner surface 154 of the wheel abutment 150 only contacts the circumferential surface 152 of the wheel 132 when the luggage article 100 is loaded over a weight capacity of the article 100 and a sufficiently large impact force is imparted on the one or more wheels 132.

Figure 10:
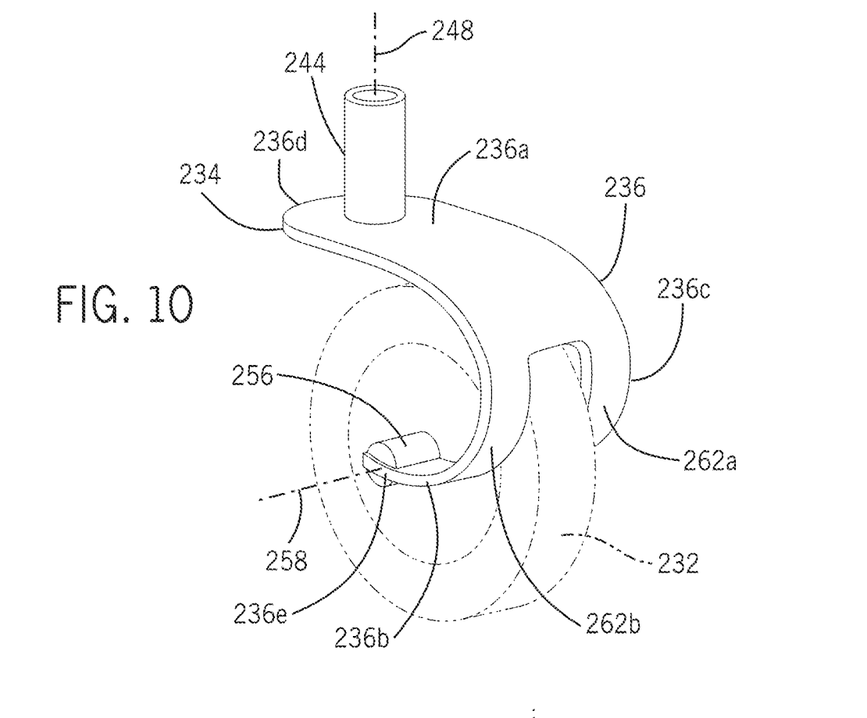
FIG. 10 is a schematic rear perspective view of a wheel bracket of a luggage article according to a second example.

Referring to FIG. 10, an alternative wheel bracket 234 that may be used with the luggage article 100 is depicted. According to this embodiment, the wheel bracket 234 includes an open loop, substantially C-shaped spring member 236, such as a leaf spring 236, that includes an upper arm 236a, a lower arm 236b, and a transition 236c formed at the intersection of the upper and lower arms 236a, 236b. The transition 236c may define an apex. A spinner axle housing 244 extends upwardly from the upper arm 236a and is located along a length of the upper arm 236a intermediate the transition 236c and an upper end 236d of the leaf spring 236. The spinner axle housing 244 defines a vertically-oriented spinner axis 248 about which the wheel bracket 234 swivels. A hub 256 is formed at a lower end 236e of the leaf spring 236 and defines a rotational axis 258 of the wheel 232. The lower arm 236b of the leaf spring 236 is bifurcated or forked to define two laterally-spaced apart tines or fingers 262a, 262b that extend from the transition 236c of the leaf spring 236 along opposing sides of the wheel 232 and terminate at the hub 256. As such, the wheel 232 may be located laterally between the tines 262a, 262b and occupy at least a portion of the space defined between the upper and lower arms 236a, 236b of the leaf spring 236. During operation, the wheel 232 may abut directly against the wheel bracket 234, thereby limiting the deformation of the leaf spring 236. The leaf spring 236 may be coated with a plastic material similar to the leaf spring 136 and the coating 138 discussed in connection with FIGS. 3-9.

Figure 11:
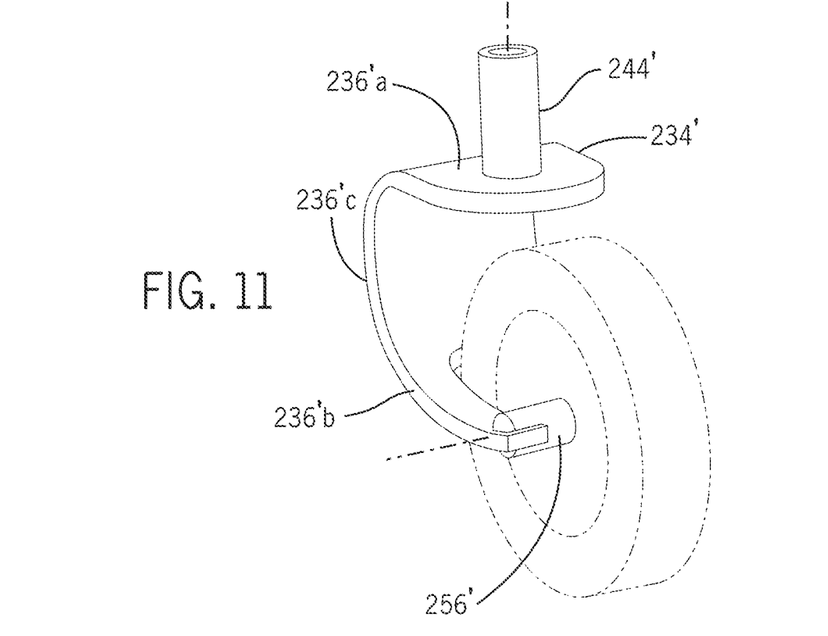
FIG. 11 is a schematic rear perspective view of a wheel bracket of a luggage article according to a second example.

Referring to FIG. 11, an alternative wheel bracket 234' similar to the wheel bracket 234 of FIG. 10 is depicted. These two wheel brackets 234, 234' may differ from each other by extension of the respective upper arms 236a, 236'a. The extension of the upper arm 236a of the wheel bracket 234 of FIG. 10 may include a greater length than the extension of the upper arm 236'a of the wheel bracket 234' of FIG. 11. As such, the transition 236c between the upper arm 236a with longer extension and the corresponding lower arm 236b and the spinner axle housing 244 may be positioned on the opposite sides of the wheel hub 256 as shown in FIG. 10. The transition 236'c between the upper arm 236'a with shorter extension and the corresponding lower arm 236'b and the spinner axle housing 244' may be positioned on the same side of the wheel hub 256' as shown in FIG. 11. When the wheel assembly is in motion, the transition 236c of the wheel bracket 234 of FIG. 10 may trail the axle housing 244, whereas the transition 236'c of the wheel bracket 234' of FIG. 11 may lead the axle housing 244'.

Further, in the implementation of FIG. 10, the effective lever arm between the hub 256 and the transition 236c is shorter than the effective lever arm between the spinner axle housing 244 and the transition 236c. As such, for a given impact load, the wheel bracket 234 may resiliently deform and the spinner axle housing 244 may move downwardly toward the lower arm 236b. In the implementation of FIG. 11, the effective lever arm between the hub 256' and the transition 236'c is longer than the effective lever arm between the spinner axle housing 244' and the transition 236'c. As such, for a given impact load, the wheel bracket 234' may resiliently deform and the wheel hub 256' may move upwardly toward the upper arm 236'a.

Figure 12:
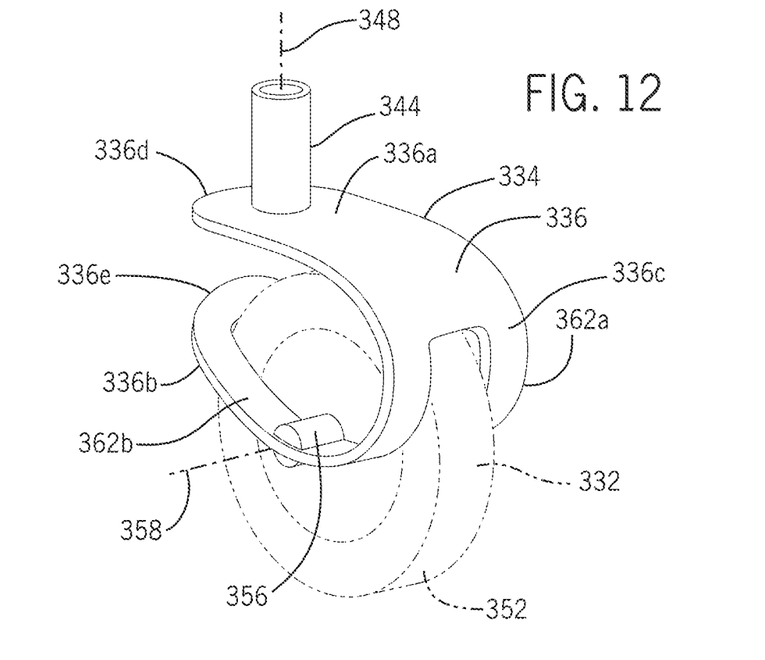
FIG. 12 is a schematic rear perspective view of a wheel bracket of a luggage article according to a third example.

Referring to FIG. 12, another wheel bracket 334 that may be used with the luggage article 100 is depicted. The wheel bracket 334 includes an open loop, substantially C-shaped spring member 336, such as a leaf spring 336, that includes an upper arm 336a, a lower arm 336b, and a transition 336c formed at the intersection of the upper and lower arms 336a, 336b. The transition 336c may define an apex. A spinner axle housing 344 extends upwardly from the upper arm 336a and is located along a length of the upper arm 336a intermediate the transition 336c and an upper end 336d of the leaf spring 336. The spinner axle housing 344 defines a vertically-oriented spinner axis 348 about which the wheel bracket 334 swivels. A hub 356 is formed along a length of the lower arm 336b of the leaf spring 336 and defines a rotational axis 358 of the wheel 332. The lower arm 336b of the leaf spring 336 is bifurcated or forked to define two laterally-spaced apart tines or fingers 362a, 362b that extend from the transition 336c of the leaf spring 336 along opposing sides of the wheel 332. The tines 362a, 362b extend beyond the hub 356 and converge together radially outwardly of the outer circumference 352 of the wheel 332 at a lower end 336e of the leaf spring 336. As such, the wheel 332 may be located laterally between the tines 362a, 362b and occupy at least a portion of the space defined between the upper and lower arms 336a, 336b of the leaf spring 336. During operation, the wheel 332 may abut directly against the wheel bracket 334, thereby limiting the deformation of the leaf spring 336. The leaf spring 336 may be coated with a plastic material similar to the leaf spring 136 and the coating 138 discussed in connection with FIGS. 3-9.

Figure 13:
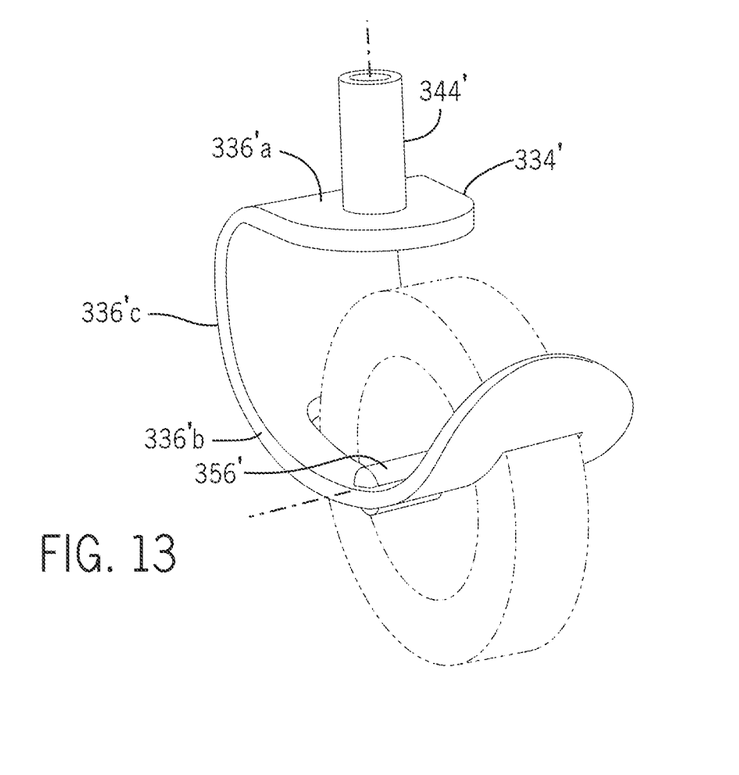
FIG. 13 is a schematic rear perspective view of a wheel bracket of a luggage article according to a third example.

Referring to FIG. 13, an alternative wheel bracket 334' similar to the wheel bracket 334 of FIG. 12 is depicted. These two wheel brackets 334, 334' may differ from each other by extension of the respective upper arms 336a, 336'a. The extension of the upper arm 336a of the wheel bracket 334 of FIG. 12 may include a greater length than the extension of the upper arm 336'a of the wheel bracket 334' of FIG. 13. As such, the transition 336c between the upper arm 336a with longer extension and the corresponding lower arm 336b and the spinner axle housing 344 may be positioned on the opposite sides of the wheel hub 356 as shown in FIG. 12. The transition 336'c between the upper arm 336'a with shorter extension and the corresponding lower arm 336'b and the spinner axle housing 344' may be positioned on the same side of the wheel hub 356' as shown in FIG. 13. When the wheel assembly is in motion, the transition 336c of the wheel bracket 334 of FIG. 12 may trail the axle housing 344, whereas the transition 336'c of the wheel bracket 334' of FIG. 13 may lead the axle housing 344'.

In the implementation of FIG. 12, the effective lever arm between the hub 356 and the transition 336c is shorter than the effective lever arm between the spinner axle housing 344 and the transition 336c. As such, for a given impact load, the wheel bracket 334 may resiliently deform and the spinner axle housing 344 may move downwardly toward the lower arm 336b. In the implementation of FIG. 13, the effective lever arm between the hub 356' and the transition 336'c is longer than the effective lever arm between the spinner axle housing 344' and the transition 336'c. As such, for a given impact load, the wheel bracket 334' may resiliently deform and the wheel hub 356' may move upwardly toward the upper arm 336'a.

Referring to FIGS. 14, 15, 16, and 17, two alternative wheel brackets 434, 534 that may be used with the luggage article 100 is depicted. Each of the wheel bracket 434, 534 includes an open loop, substantially C-shaped spring member 436, 536, such as a leaf spring 436, 536, that includes an upper arm 436a, 536a, a lower arm 436b, 536b, and a transition 436c, 536c formed at the intersection of the upper and lower arms 436a, 436b, 536a, 536b. The transition 436c, 536c may define an apex. A spinner axle housing 444, 544 extends upwardly from the upper arm 436a, 536a and is located along a length of the upper arm 436a, 536a intermediate the transition 436c, 536c and an upper end 436d, 536d of the leaf spring 436, 536. The spinner axle housing 444, 544 defines a vertically-oriented spinner axis 448, 548 about which the wheel bracket 434, 534 swivels. A hub 456, 556 is formed at a lower end 436e, 536e of the leaf spring 436, 536 and defines a rotational axis 458, 558 of the wheels 432, 532. The leaf spring 436, 536 may be coated with a plastic material similar to the leaf spring 136 and the coating 138 discussed in connection with FIGS. 3-9.

In the implementations of FIGS. 14, 15, 16, and 17, the extension of each of the upper arm 436a, 536a may include a length much less than that of the wheel brackets discussed in connection with FIGS. 3-13. The spinner axle housing 444, 544 may be adjacent the transition 436c, 536c and positioned on the same side of the wheel hub 456, 556 as the transition 436c, 536c. When the wheel assembly is in motion, the transition 436c, 536c of the wheel bracket 434, 534 may lead the axle housing 444, 544. The effective lever arm between the hub 456, 556 and the transition 436c, 536c is longer than the effective lever arm between the spinner axle housing 444, 544 and the transition 436c, 536c. As such, for a given impact load, the wheel bracket 434, 534 may resiliently deform and the wheel hub 456, 556 may move upwardly toward the upper arm 436a, 536a.

Figure 14:
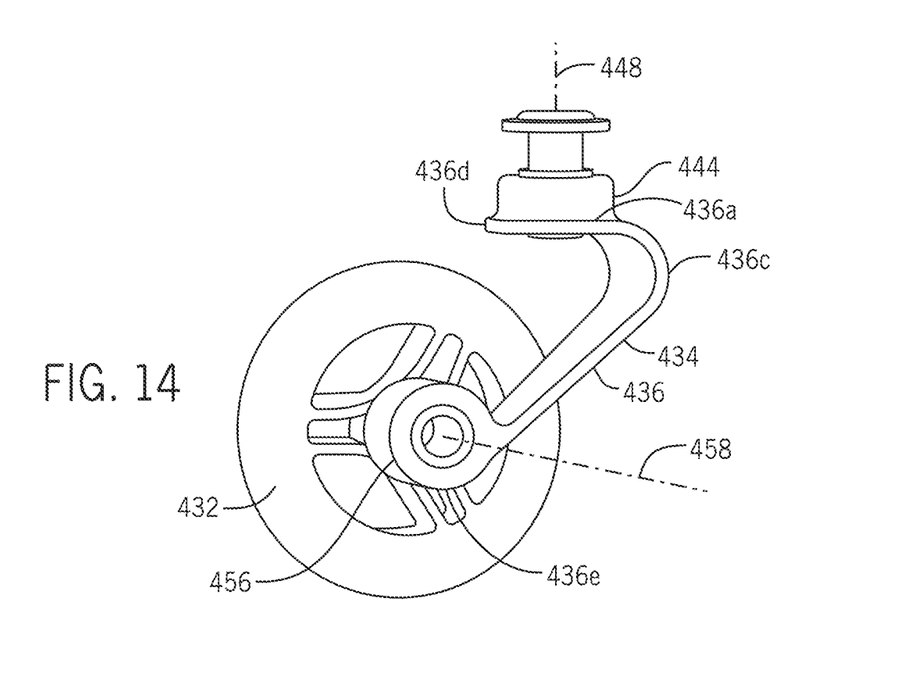
FIG. 14 is a schematic rear perspective view of a wheel assembly of a luggage article according to a fourth example; one wheel is removed to show a wheel bracket.
Figure 15:
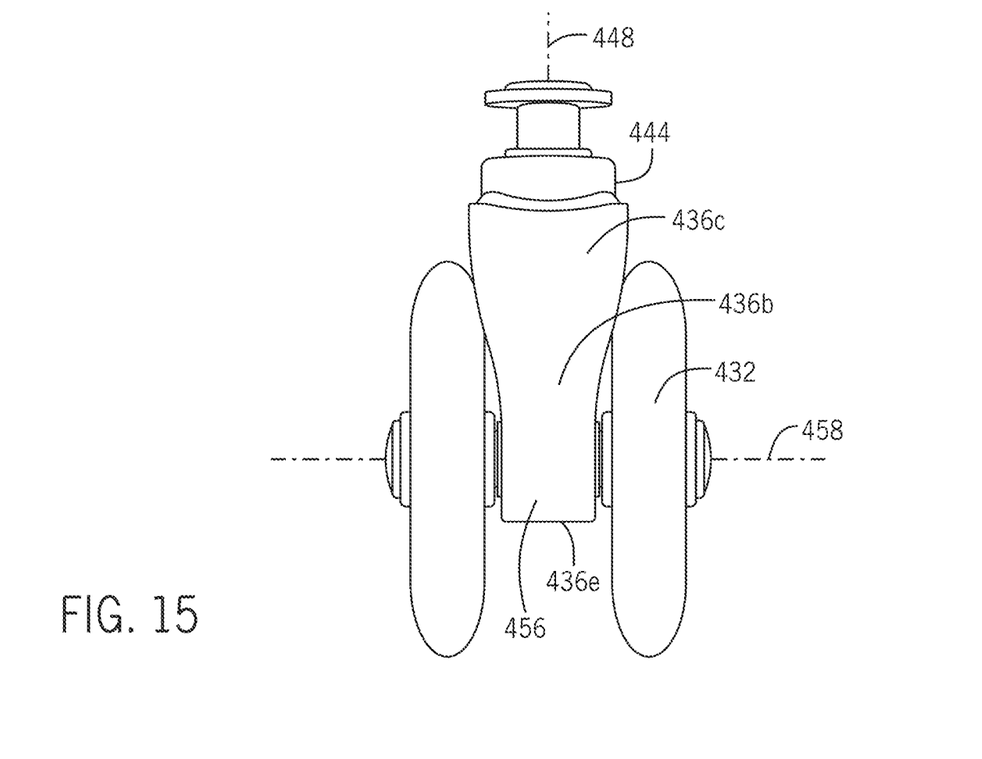
FIG. 15 is a schematic front elevation view of a wheel assembly shown in FIG. 14 with both wheels attached.

The implementation of FIGS. 14 and 15 may differ from other embodiments in that the lower arm 436b may extend to form a substantially straight length. The lower arm 436b may further include a varied width dimension along its longitudinal dimension. At least an upper portion or the entirety of the lower arm may taper from the transition 436c toward the hub 456.

Figure 16:
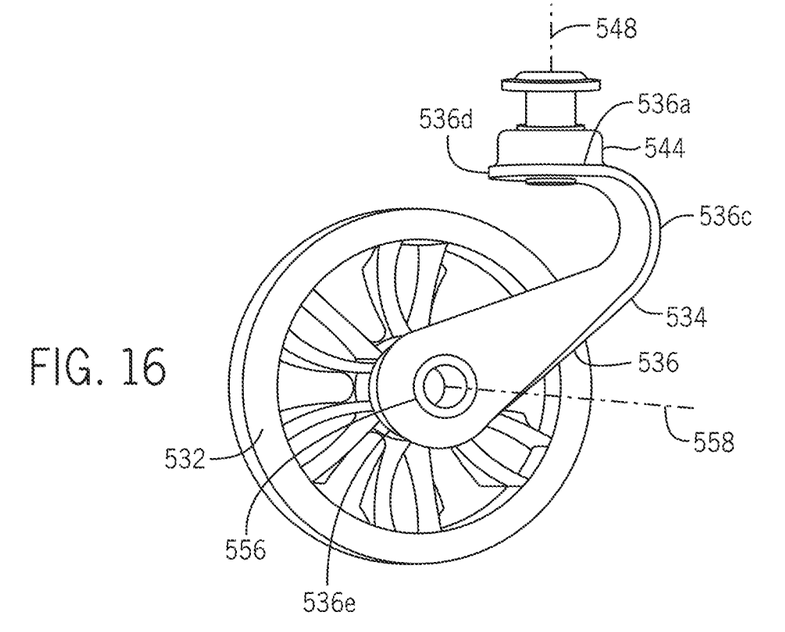
FIG. 16 is a schematic rear perspective view of a wheel assembly of a luggage article according to a fifth example; one wheel is removed to show a wheel bracket.
Figure 17:
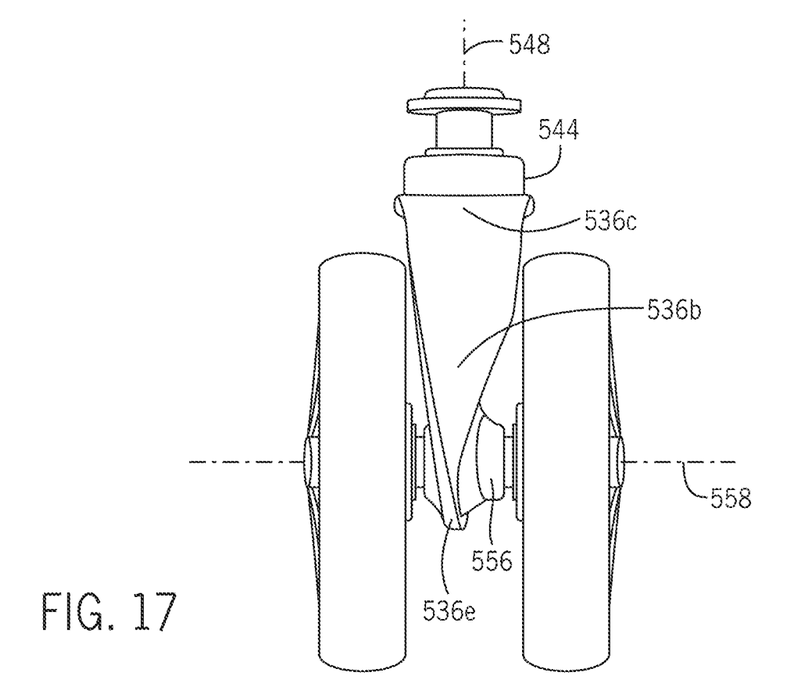
FIG. 17 is a schematic front elevation view of a wheel assembly shown in FIG. 16 with both wheels attached.

The implementation of FIGS. 16 and 17 may differ from other embodiments in that the lower arm 536b may extend to form a twisted shape such that the end portion 536e of the lower arm 536b may be oriented substantially parallel to the wheels and perpendicular to the rotational axis of the wheels. Twisting the lower arm 536b may allow at least some or maybe a majority of the impact force to be transferred from the wheel axle to the wheel bracket 534 along, as opposed to perpendicular to, the extension of the lower arm 536b.

Figures 18, 19, 20:
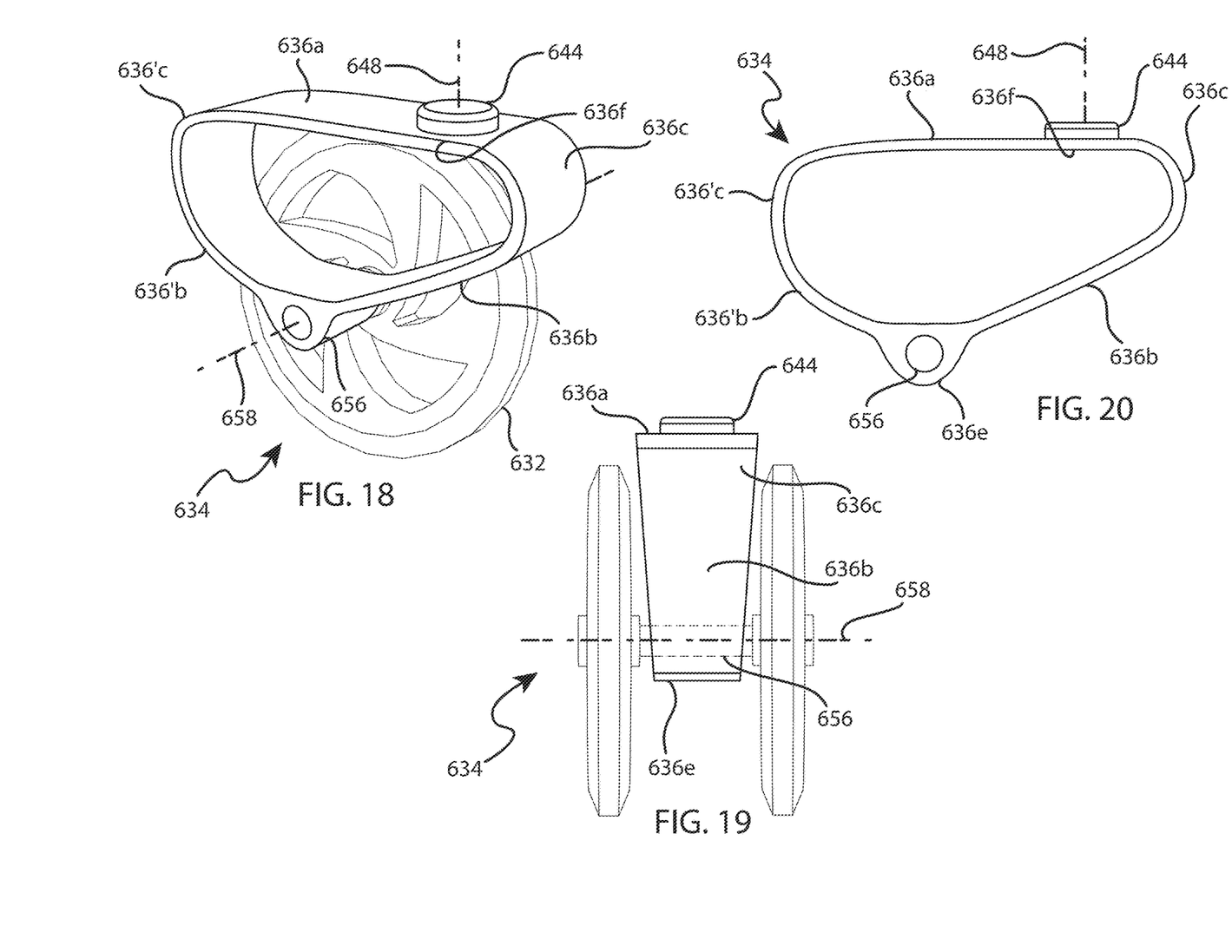
FIG. 18 is a schematic rear perspective view of a wheel bracket of a luggage article according to a sixth example.
FIG. 19 is a schematic front elevation view of a wheel assembly shown in FIG. 18 with both wheels attached.
FIG. 20 is a schematic rear perspective view of the wheel bracket of FIG. 18.

Referring now to FIGS. 18-20, an alternative wheel bracket 634 that may be used with the luggage article 100 is depicted. The implementation of FIGS. 18-20 may differ from other embodiments in that the wheel bracket 634 includes a spring member 636, such as a leaf spring 636, with a closed loop, having a substantially O-shaped, oval-shaped, or D-shaped profile. The leaf spring 636 includes an upper arm 636a, a front lower arm 636b, a rear lower arm 636'b, a front transition 636c formed at the intersection of the upper and front lower arms 636a, 636b, and a rear transition 636'c formed at the intersection of the upper and rear lower arms 636a, 636'b. The transitions 636c, 636'c may each define an apex. A spinner axle housing 644 extends from the upper arm 636a and is located at an intermediate portion 636f along a length of the upper arm 636a between front and rear transitions 636c, 636'c of the leaf spring 636. The spinner axle housing 644 defines a vertically-oriented spinner axis 648 about which the wheel bracket 634 swivels.

In a D-shaped configuration, the upper arm 636a is substantially linear, and the portion of the bracket formed by front transition 636c, front lower arm 636b, rear lower arm 636'b, and rear transition 636'c is curved. The front portion of the D-shaped configuration, such as between the front end of upper arm 636a and front lower arm 636b, may be relatively shorter in height than the rear portion, such as between the rear end of upper arm 636a and rear lower arm 636'b.

As shown in FIGS. 18-19, one or more wheels 632 may be rotationally attached to the lower arms 636b, 636'b of the leaf spring 636. A hub 656 is positioned at a lower end 636e of the leaf spring 636 and defines a rotational axis 658 of the wheel 632. The hub 656 is located at the apex formed at the intersection of the front lower arm and rear lower arms 636b and 636'b. The hub 656, which may be formed as a cylindrical sleeve, may receive an axle and/or axle bearing associated with the one or more wheels 632 and define a rotational axis 658 of the wheel(s) 632. The rotational axis 658 may be horizontally oriented, or otherwise generally perpendicular to the swivel axis 648.

During operation, front and rear lower arms 636b, 636'b may resiliently pivot about the front and rear transitions 636c, 636'c of the leaf spring 636, respectively. The front and rear lower arms 636b, 636'b may also bend or flex along its length in a relatively upward direction toward upper arm 636a in order to absorb, attenuate, or dampen impact loads imparted on the one or more wheels 632. Similarly, the upper arm 636a of the leaf spring 636 may resiliently pivot about the front and rear transitions 636c, 636'c of the leaf spring and/or bend or flex along its length in a relatively downwardly direction toward the front and rear lower arms 636b, 636'b to absorb, attenuate, or otherwise dampen loads generated by the weight of the user's belongings or other contents of the luggage article 100 as the one or more wheels 632 encounter surface features when in use. Thus, during operation, the upper arm 636a and lower arms 636b, 636'b of the leaf spring 636 may elastically deform toward one another to absorb impact loads. To limit the compressive deformation of the leaf spring 636, the one or more wheels 632 may abut directly against the wheel bracket 634. The leaf spring 636 may be coated with a plastic material similar to the leaf spring 136 and the coating 138 discussed in connection with FIGS. 3-9, and similarly the coating may also form the hub 656 at the lower end 636e as well as the spinner axle housing 644 at the intermediate portion 636f. Generally, the wheel bracket includes a loop-shaped spring member, such as a leaf spring, which may be overmoulded with a plastic material. Relative to conventional luggage wheel brackets, the loop-shaped wheel bracket of the present disclosure may include a spinning axle function, a spring function, a wheel axle function, and a bracket function combined in a single component. The combination of these functions into a single wheel bracket component generally results in quieter wheel operation with reduced weight. For instance, the wheel bracket may include an integrally-formed wheel hub and spinner housing or axle, such that the wheel hub, the spinner housing, and the leaf spring are formed together as a single component, resulting in reduced weight relative to conventional luggage wheel brackets. The resilient loop-shaped leaf spring of the present disclosure generally absorbs or attenuates more shock and/or vibrational loads during rolling than conventional luggage wheel brackets, resulting in reduced noise and substantially silent rolling.

The luggage wheel bracket of the present disclosure has broad application. For instance, the wheel bracket may be coupled to a single spinner wheel, a double spinner wheel, and/or an upright wheel. Additionally, the luggage wheel bracket of the present disclosure may be coupled to various types of luggage articles, such as a hard-side suitcase, a soft-side case, a hybrid-side case, a duffel bag, or other types of luggage articles.

The apparatuses and associated methods in accordance with the present disclosure have been described with reference to particular embodiments thereof in order to illustrate the principles of operation. The above description is thus by way of illustration and not by way of limitation. In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments.

All relative and directional references (including: upper, lower, upward, downward, left, right, leftward, rightward, top, bottom, side, above, below, front, middle, back, vertical, horizontal, and so forth) are given by way of example to aid the reader's understanding of the particular embodiments described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A luggage wheel assembly comprising:
    a wheel bracket rotatably attached to a luggage article about a generally vertical spinner axis, wherein the vertical spinner axis is defined by a spinner axle housing; and
    one or more wheels attached to the wheel bracket, wherein the wheel bracket comprises a spring member having a loop-shaped profile and the one or more wheels are rotationally attached at or adjacent to a lower end of the loop-shaped spring member about a rotational axis,
    wherein the loop-shaped spring member includes a lower arm that is integrally formed with the upper arm and defines a transition or an apex,
    wherein at least one end portion of the lower arm defines a hub for attaching the one or more wheels,
    wherein the spinner axle housing is located closer to the transition or apex than the hub is located to the transition or apex, and
    wherein at least one portion of the upper arm of the spring member extends substantially uniformly about a portion of the outer circumference of the one or more wheels.

2. A luggage wheel assembly as claimed in claim 1, wherein the loop-shaped profile of the spring member is an open loop profile.

3. A luggage wheel assembly as claimed in claim 2, wherein the spring member has an open loop profile and is a C-shaped spring member.

4. A luggage wheel assembly as claimed in claim 1, wherein the wheel bracket is attached to the luggage article at a location on the upper arm of the spring member.

5. A luggage wheel assembly as claimed in claim 4, wherein at least one portion of the lower arm of the spring member extends to form a curve.

6. A luggage wheel assembly as claimed in claim 1, wherein the lower arm extends radially inwardly from the transition or apex toward the rotational axis of the one or more wheels.

7. A luggage wheel assembly as claimed in claim 6, wherein the wheel bracket is attached to the luggage article distal to the transition.

8. A luggage wheel assembly as claimed in claim 1, wherein the loop-shaped spring member is selected from a metal leaf spring, a steel leaf spring, a titanium leaf spring, a polymeric leaf spring, a carbon-fiber-reinforced composite leaf spring, or a combination thereof.

9. A luggage wheel assembly as claimed in claim 1, wherein the wheel bracket further comprises a coating that at least partially surrounds the loop-shaped spring member.

10. A luggage wheel assembly as claimed in claim 1 wherein
    the coating forms the hub at the lower end of the loop-shaped spring member for attaching the one or more wheels to the wheel bracket.

11. A luggage wheel assembly as claimed in claim 1, wherein
    the wheel bracket is attached to the luggage article at said at least one portion, said at least one portion comprises a substantial portion of an upper arm.

12. A luggage wheel assembly as claimed in claim 1, wherein an arm length defined by the upper arm is substantially equal to an arm length defined by the lower arm.

13. A luggage wheel assembly as claimed in claim 1, wherein
    the wheel bracket forms one or more wheel abutments adapted to contact an outer circumferential surface of the one or more wheels to limit the deformation of the loop-shaped spring member.

14. A luggage article comprising one or more luggage wheel assemblies as claimed in claim 1, wherein the luggage article comprises a plurality of walls together defining an outer structure of the luggage article, the one or more luggage wheel assemblies are attached to and extending from one of the walls.

15. A luggage wheel assembly as claimed in claim 1, wherein the wheel bracket is attached to the luggage article at an intermediate position of the upper arm.

16. A luggage wheel assembly as claimed in claim 1, wherein the wheel bracket is attached to the luggage article proximate an end portion of the upper arm.

* * * * *